United States Patent [19]

Liedle

[11] Patent Number: 4,717,108
[45] Date of Patent: Jan. 5, 1988

[54] TEMPORARY ELECTRICAL SERVICE SUPPORT SYSTEM INCLUDING NOVEL SELF-CONTAINED BRACKET MEMBER

[76] Inventor: William O. Liedle, 2809 E. 27th St., Vancouver, Wash. 98661

[21] Appl. No.: 927,455

[22] Filed: Nov. 6, 1986

[51] Int. Cl.⁴ .................................... F16M 11/38
[52] U.S. Cl. ........................ 248/432; 248/163.2; 248/164; 248/440
[58] Field of Search .............. 248/432, 431, 440, 164, 248/163.1, 163.2, 188

[56] References Cited

U.S. PATENT DOCUMENTS

| | | | |
|---|---|---|---|
| 1,355,944 | 10/1920 | Dale | 248/164 X |
| 1,845,921 | 2/1932 | Karwoski | 248/164 X |
| 2,368,740 | 2/1945 | Blomgren | 248/432 X |
| 2,864,576 | 12/1958 | Breslau | 248/432 |
| 3,309,055 | 3/1967 | Sefcik | 248/431 |
| 3,591,113 | 7/1971 | Foster | 248/163.1 |
| 4,184,711 | 1/1980 | Wakimoto | 248/164 X |
| 4,423,849 | 1/1984 | Jordan | 248/431 X |

FOREIGN PATENT DOCUMENTS 0443044 3/1936 United Kingdom ............... 248/164

Primary Examiner—Ramon O. Ramirez
Attorney, Agent, or Firm—Marger & Johnson

[57] ABSTRACT

The present invention relates to a temporary electrical service support system including leg members, having a rectangular cross-sectional configuration which can be effectively supported in a stable upright position during use at a construction site by a novel self-contained bracket means without the use of supplemental attachment means. The system of this invention further includes a self-contained bracket member comprising a plate means having a plurality of rectangularly shaped slots located about its periphery for receiving and securing a plurality of leg members therewithin. Centrally located, joined to, and extending from the plate means is stabilizing block means. The sides of the block means are in substantial engagement with the adjacent inner sides of each of the leg members.

22 Claims, 8 Drawing Figures

TEMPORARY ELECTRICAL SERVICE SUPPORT SYSTEM INCLUDING NOVEL SELF-CONTAINED BRACKET MEMBER

BACKGROUND OF THE INVENTION

This invention relates to a novel temporary electrical service support system including a novel self-contained bracket member which supports in an upright position a plurality of leg support members having a rectangular cross-sectional configuration.

In the building industry providing a temporary electric service, prior to permanent installation, is typically done on a makeshift basis by fastening together wooden boards having a rectangular cross-sectional configuration, and propping up the makeshift service, typically by lashing the boards together with wire and the like. This process is repeated each time the temporary service is to be assembled at a construction site. Since an effective and efficient system for supporting these wooden boards has not been found, the makeshift structure will often times not remain intact for the life of the entire construction project. For example, the boards in the makeshift system will become disengaged from each other or the boards become broken due to effects of the lashing process.

It is known in the prior art directed to structures unrelated to temporary electrical service support systems to support a plurality of leg members having a symmetrical circular cross-sectional configuration using means which are not self-contained. In these latter systems intermediately disposed openings in one or more flat, circular plates are employed in combination with auxiliary attachment at the other end to a table top, a seat, a canvas sheet, or a washer, or by combined auxiliary attachment at one end to a seat and at the other end to a metallic tension strap. See U.S. Pat. No. 3,309,055, U.S. Pat. No. 2,368,740, U.S. Pat. No. 4,184,711, British No. 443 044 and U.S Pat. No. 1,355,944. In U.S. Pat. No. 4,423,849, the second point of support is provided by the frictional binding engagement of the three legs above the flat clinch plate. Support legs having a symmetrical circular cross-sectional configuration are more readily maintainable in a stable upright position than their rectangular cross-sectional counterpart structures because they can be easily bound together at these other supplemental engagement points.

Accordingly, there is a need for a temporary electrical service support system in which a plurality of leg members having a rectangular cross-sectional configuration can be supported by an effective self-contained support means which does not require supplemental attachment means.

SUMMARY OF THE INVENTION

The present invention relates to a temporary electrical service support system including leg members, having a rectangular cross-sectional configuration which can be effectively supported in a stable upright position during use at a construction site by a novel self-contained bracket means without the use of supplemental attachment means.

It was found by applicant that when a flat plate means per se, having a trio of rectangular slots located about its periphery, was employed to support a trio of leg members, each having a rectangular cross-sectional configuration, in an effort to support such leg members in an upright position resultant structure was unstable.

The system of this invention further includes a self-contained bracket member comprising a plate means having a plurality of rectangularly shaped slots located about its periphery for receiving and securing a plurality of leg members therewithin. Centrally located, joined to, and extending from the plate means is stabilizing block means. The sides of the block means are in substantial engagement with the adjacent inner sides of each of the leg members. In this way, additional required support for maintaining the temporary electrical service support system in an upright position is provided at the point of engagement between the respective sides of the stabilizing block means and the inner side of each leg member. When the above block means is employed in combination with the plate means, the required level of stability is imparted to the support system structure of this invention, without the use of supplemental attachment means.

In one form of the present invention, the respective slot means are spaced apart one from the other to form a centrally located substantially triangular area therewithin. A stabilizing block means having a substantially triangular cross-sectional configuration can then be joined to the plate means within that area. In this way each side of the block means will be in substantial engagement with one of the inner sides of each of the leg members. To promote an overall balanced stability to the system, the block means preferably comprises a substantially equilateral triangle, and the slot means are preferably spaced substantially equidistantly one from the other. By employing this structural relationship, the respective inner sides of legs are maintained in a relative position adjacent and substantially parallel to the respective sides of the block means to facilitate substantial engagement of the legs with the block means.

In another form of the system of this invention, four slot means are included in the plate means. Three of the slot means are located about the periphery of the plate means and the fourth slot is centrally located. Furthermore, this system has two stabilizing block means located within the central area formed between the three outer slot means and centrally located slot means. Preferably, the respective inner sides of the slot means are adjacent and parallel to at least one of the respective sides of the block means, while both sides of the centrally located slot means are adjacent and substantially parallel to a least one side of the block means. This provides for the maximum engagement of the leg members and the bracket member, respectively, so that maximized stabilization of the system will occur. The cross-sectional configuration of the block means in this latter service system structure is that of a right triangle.

The temporary electrical service support system of this invention can be easily assembled by first locating the rectangularly shaped leg members within the respective rectangularly shaped slots about the periphery of the bracket member. The legs are then moved to an upright spread position with a portion of their sides engaging both the slot and the stabilizing block means, respectively. In this case, the leg members are interlocking secured in a stabilized upright position with respect to the surface on which they are supported so that the electrical wires can be set in place above ground level for temporary use.

The foregoing and other objects, features and advantages of this invention will become more readily appar-

DETAILED DESCRIPTION OF THE PREFERRED EMBODIMENT

Figure 1:
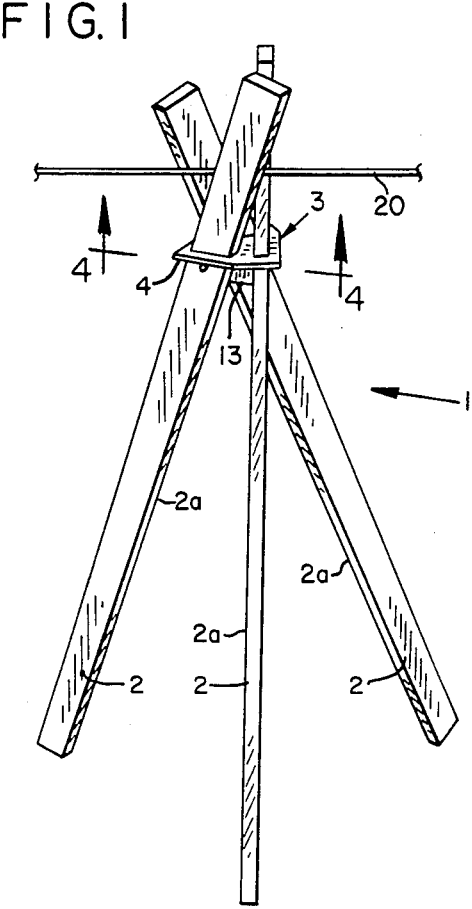
FIG. 1 is a perspective view of a preferred novel temporary electrical system of the present invention.
Figure 2:
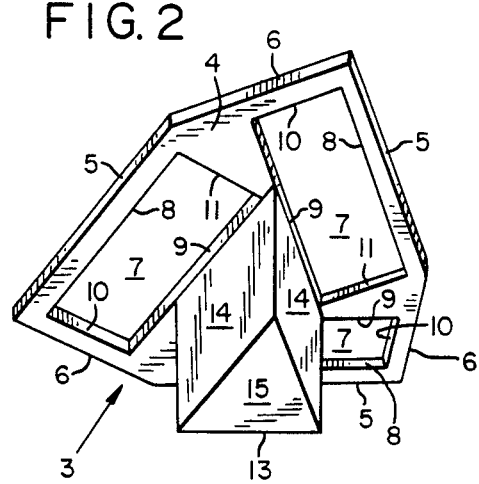
FIG. 2 is an enlarged, perspective view of the bracket means 3 of FIG. 1.
Figure 3:
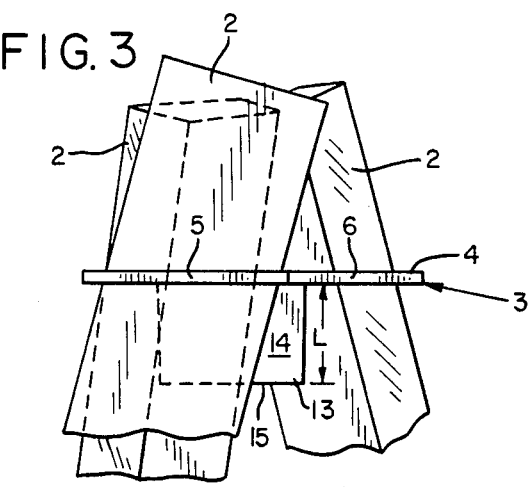
FIG. 3 is an enlarged, perspective view of the upper portion of FIG. 1.
Figure 4:
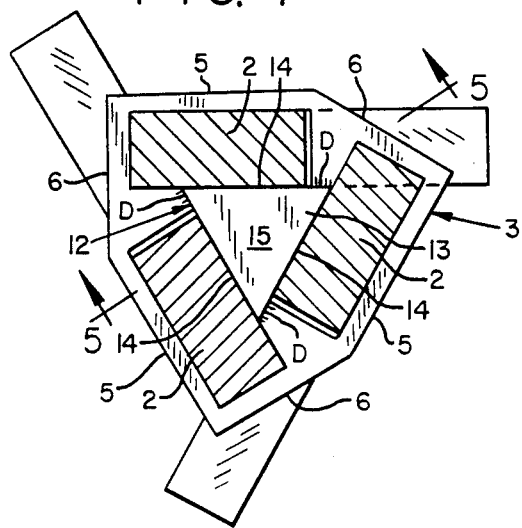
FIG. 4 is a sectional view taken along line 4—4 of FIG. 1.

Referring now to FIGS. 1–5, a generally tripod-shaped version of temporary electrical service support system 1 is depicted for maintaining electrical wire 20 above ground level. The system 1 comprises a plurality of leg members 2 having a substantially rectangular cross-sectional configuration (see FIG. 4). Typically, wooden boards having a rectangular cross-sectional configuration, such as 2×4's, 4×4's, or 2×6's, are employed for this purpose.

Leg members 2, having a substantially rectangular cross-sectional configuration, can be effectively supported in an upright position by a self-contained bracket member 3 (see particularly FIGS. 2–5). Bracket means 3 includes a substantially flat plate means 4. Although plate means 4 can be fabricated in any number of plan configurations, the tripod bracket version particularly shown in FIGS. 2 and 4 has a hexagonal plan configuration. In one form of the preferred hexagonal configuration, longer plate sides 5 are alternatively disposed adjacent to shorter plate sides 6. A plurality of rectangularly-shaped slots 7 are located about the periphery of plate means 4 for receiving and securing leg members 2 therewithin. In this preferred hexagonal configuration, longer plate sides 5 are located substantially parallel and adjacent to longer outside slots 8. Shorter plate sides 6 are in turn disposed substantially parallel and adjacent to the end slot sides 10 of slot 7. The rectangular cross-sectional configuration of legs 2 are generally slightly smaller than the slot 7 formed by longer sides 8 and 9 and end slot sides 10 and 11.

Slots 7 are located about the periphery of plate means 4 and are preferably spaced apart one from the other to form a centrally located substantially triangular area 12 therebetween. Slot means 7 are preferably spaced substantially equidistantly one from the other. Thus, in this latter preferred case, the distance "D", the shortest distance between the respective slots is substantially the same between each of the slots 7.

Stabilizing block means 13, comprising side section 14 and top section 15, is centrally located in triangular area 12. Block means 13 is joined to, and extends from, plate means 4. Side sections 14 comprises a length "L" (see FIG.3). Although a larger dimension can be employed, preferably length "L" is about 2 inches for maximizing the engagement area of side 14a with inner leg side 2a.

Figure 5:
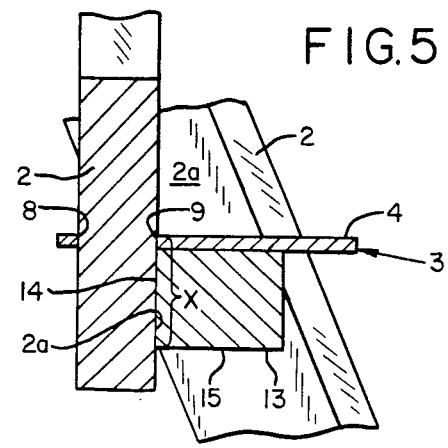
FIG. 5 is a sectional view taken along line 5—5 of FIG. 4.

As best seen in FIG. 5, block means 13 is in substantial engagement with inner side 2a of each leg member 2 for providing the required additional upright support for the temporary electrical service support system 1, at the point of engagement "X". Block means 13 typically has a substantially triangular cross-sectional configuration. As clearly seen in FIG. 4, block means 13 is disposed within a centrally-located substantially-triangular area 12 so that the inner side 2a of each leg members 2 is in substantial engagement with one of sides 14 of block 13. In the instant case where the trio of slot means 7 are substantial equidistantly spaced one from the other, the cross-sectional configuration of block means 13 is that of a substantially equilateral triangle in which the length of sides 14 are substantially the same. In any case, in order to facilitate the substantially complete engagement of leg members 2 and block means 13, one with the other, inner sides 9 of slot means 7 are preferably disposed adjacent and substantially parallel to the respective sides 14 of block means 13.

Figure 6:
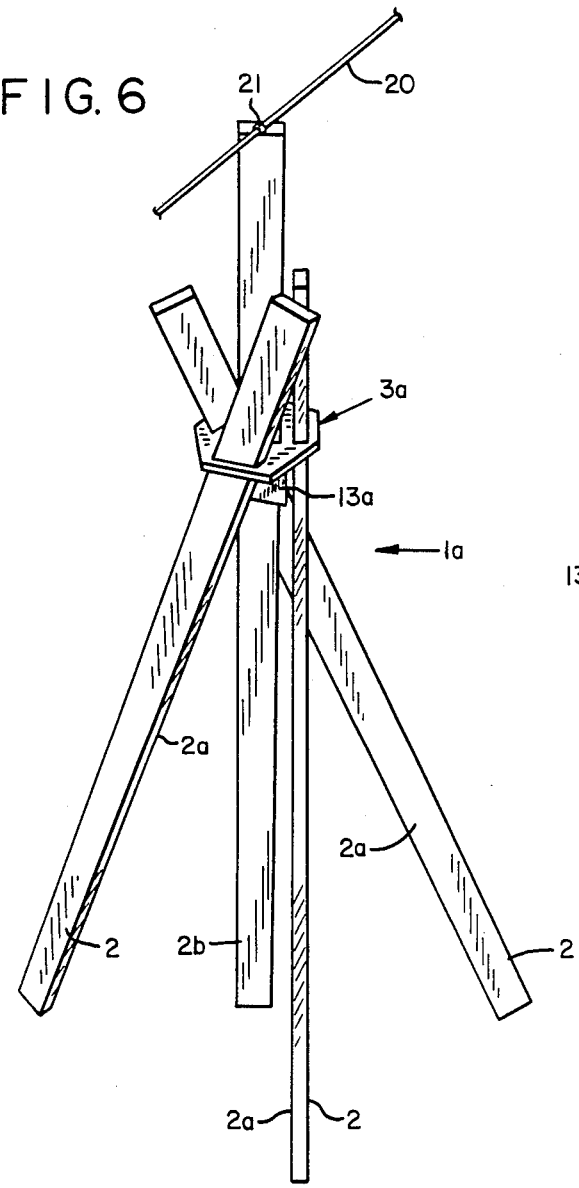
FIG. 6 is a perspective view of a further preferred novel temporary electrical service support system of the present invention.
Figure 7:
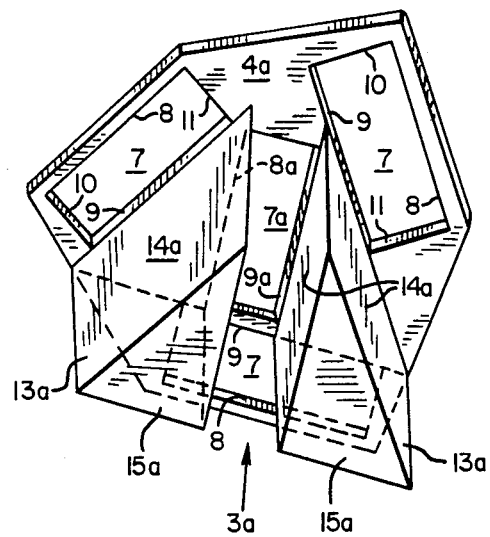
FIG. 7 is a perspective view of the bracket means 3a of the invention of FIG. 6.
Figure 8:
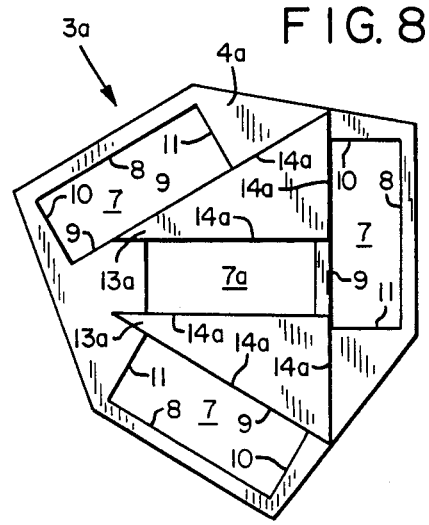
FIG. 8 is a plan view of bracket means 3a of FIG. 7.

Referring now to FIGS. 6–8, a temporary electrical service support system 1a is shown comprising a tripod formed of legs 2, but also including a substantially vertically-extending leg member 2b for supporting wire 20 above ground level. An attachment means 21, such as a clip means or nails, can be employed to join wire 20 to system 1a. This temporary electrical service support system 1a includes a bracket member 3a which includes four slot means, three of said slot means 7 being located around the periphery of plate means 4a, as previously configured in plate means 4, and one of the slot means 7a being centrally located to receive the vertical leg member 2b. The system 1a also includes two stabilizing block means 13a, each of which are located within the central area of system 1a within the confines of slot means 7 and 7a, respectively. As was the case with respect to system 1, it is preferred that slot means 7 are equidistantly spaced one from the other, and that the cross-sectional configuration of block means 13a is triangular in shape. The inner sides 9 of the peripherally located slot means 7 are adjacent and substantially parallel to at least one of the respective sides 14a of the pair of block means 13a. In addition, both sides 8a and 9a of the centrally-located slot means 7a are adjacent and substantially parallel to at least one of the respective sides 14a from said block means 13a. The preferred cross-sectional configuration of block means 13a of system 1a is substantially that of a right triangle. As in the case of bracket member 4, bracket member 3a comprises a plate means 4a which is substantially hexagonal in configuration.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. A self-contained bracket member for supporting a plurality of leg members having a rectangular cross-sectional configuration in an upright position, without requiring supplemental support means, to form a temporary electrical service support system, which comprises:

a. plate means;

b. a plurality of rectangularly shaped slots located within, and disposed about the periphery of, said plate means for receiving and securing a plurality of said leg members therewithin; and c. stabilizing block means centrally located, joined to, and extending from said plate means which engages the inner side of each said leg member for maintaining said system in an upright position at the point of engagement between the respective sides of said block means and the inner side of each leg member.

2. The bracket member of claim 1, wherein said respective slot means are spaced apart one from the other to form a centrally located substantially triangular area therebetween, and said raised stabilizing block means has a substantially triangular cross-sectional configuration and is disposed within said centrally located substantially triangular area such that each side of said triangular block engages one of the inner sides of said leg members.

3. The bracket member of claim 2, wherein said slot means are substantially equidistantly spaced one from the other, and the cross-sectional configuration of said block means is that of a substantially equilateral triangle.

4. The bracket member of claim 3, wherein the respective inner sides of said slot means are adjacent and substantially parallel to the respective sides of block means.

5. The bracket member of claim 1, which includes three slot means and a single block means.

6. The bracket member of claim 1, which comprises four slot means, three of said slot means being located about the periphery of said plate means and one of said slot means being centrally located; and two raised stabilizing block means, said block means being located within the central area between said four slot means.

7. The bracket member of claim 6, wherein said slot means are substantially equidistantly spaced one from the other, and the cross-sectional configuration of said block means is triangular.

8. The bracket member of claim 7, wherein the respective inner sides of said peripherally located slot means are adjacent and substantially parallel to at least one of the respective sides of said block means, and both sides of the centrally located slot means are adjacent and substantially parallel to at least one of the respective sides of said block means.

9. The bracket member of claim 6, wherein the cross-sectional configuration of said block means is substantially that of a right triangle.

10. A temporary electrical service support system, which comprises:

a. a plurality of leg members having a substantially rectangular cross-sectional configuration;

b. a bracket member for supporting said leg members in an upright position comprising a plate means, a plurality of rectangularly shaped slots located about the periphery of said plate means for receiving and securing a plurality of said leg members therewithin; and stabilizing block means centrally located, joined to, and extending from said plate means, which engages one of the side of each said leg member for maintaining said system in an upright position at the point of engagement between the respective sides of said block means and the inner side of each leg member.

11. The service system of claim 10, wherein said respective slot means are spaced apart one from the other to form a centrally located substantially triangular area therebetween, and said raised stabilizing block means has a substantially triangular cross-sectional configuration such that each side of said triangular block engages one of the inner sides of said leg members.

12. The electrical service support system of claim 11, wherein said slot means are substantially equidistantly spaced one from the other, and the cross-sectional configuration of said block means is that of a substantially equilateral triangle, the respective inner sides of said slot means being adjacent and substantially parallel to the respective sides of block means.

13. The electrical service support system of claim 11, which includes four slot means, three of said slot means being located about the periphery of said plate means and one of said slot means being centrally located, and two raised stabilizing block means, said block means being located within the central area between said four slot means.

14. The electrical service support system of claim 13, wherein said slot means are substantially equidistantly spaced one from the other, and the cross-sectional configuration of said block means is triangular.

15. The electrical service support system of claim 13, wherein the respective inner sides of said peripherally located slot means are adjacent and substantially parallel to at least one of the respective sides of said block means, and both sides of the centrally located slot means are adjacent and substantially parallel to at least one of the respective sides of said block means.

16. The electrical service support system of claim 14, wherein the cross-sectional configuration of said block means is substantially that of a right triangle.

17. A method for forming a novel bracket member which comprises:

a. forming a plate means;

b. locating a plurality of rectangularly shaped slots about the periphery of said plate means for receiving and securing a plurality of leg members therewithin; and c. locating and joining a stabilizing block means centrally to, and extending from, said plate means for engaging one of the sides of each said leg member for providing additional upright support for said temporary electrical service support system at the point of engagement.

18. The method of claim 17, which includes the further step of spacing apart one from the other said respective slot means to form a centrally located substantially triangular area therebetween, and forming said raised stabilizing block means so that it has a substantially triangular cross-sectional configuration wherein each side of said block engages one of the inner sides of said leg members.

19. The method of claim 17, which further includes the step of locating the respective inner sides of said slot means adjacent and substantially parallel to the respective sides of block means.

20. The method of claim 17, which includes the step of locating four slot means within said plate means, three of said slot means being located about the periphery of said plate means and one of said slot means being centrally located, and joining two raised stabilizing block means to said plate means, said block means being located within the central area between said four slot means.

21. The method of claim 17, which includes the step of spacing said slot means substantially equidistantly one from the other, forming said block means so that its cross-sectional configuration is triangular.

22. The method of claim 17, which includes the step of locating the respective inner sides of said peripheral slot means adjacent and substantially parallel to at least one of the respective sides of said block means, and centrally locating both sides of the slot means adjacent and substantially parallel to at least one of the respective sides of said block means.

* * * * *